US011021318B2

(12) United States Patent
Schaude (10) Patent No.: US 11,021,318 B2
(45) Date of Patent: Jun. 1, 2021

(54) CAPSULE FOR USE IN EXTRACTION MACHINE

(71) Applicant: SWISS COFFEE COMPANY AG, Widnau (CH)

(72) Inventor: Nick Schaude, Ruthi (CH)

(73) Assignee: SWISS COFFEE COMPANY AG

(*) Notice: Subject to any disclaimer, the term of this patent is extended or adjusted under 35 U.S.C. 154(b) by 461 days.

(21) Appl. No.: 15/577,325

(22) PCT Filed: May 27, 2016

(86) PCT No.: PCT/CH2016/000083
§ 371 (c)(1),
(2) Date: Nov. 27, 2017

(87) PCT Pub. No.: WO2016/187724
PCT Pub. Date: Dec. 1, 2016

(65) Prior Publication Data
US 2018/0148250 A1    May 31, 2018

(30) Foreign Application Priority Data
May 27, 2015 (CH) .................................. 00743/15

(51) Int. Cl.
*B65D 85/804* (2006.01)
*A47J 31/40* (2006.01)

(52) U.S. Cl.
CPC ......... *B65D 85/8043* (2013.01); *A47J 31/407* (2013.01)

(58) Field of Classification Search
CPC ........................... B65D 85/8043; A47J 31/407
See application file for complete search history.

(56) References Cited

U.S. PATENT DOCUMENTS

| 2005/0150391 A1 | 7/2005 | Schifferle | |
| 2012/0097602 A1* | 4/2012 | Tedford | B65D 65/466 210/500.1 |
| 2012/0241352 A1* | 9/2012 | Pramanik | B65D 1/265 206/524.1 |
| 2015/0151903 A1* | 6/2015 | Bartoli | B65D 85/8043 426/115 |

FOREIGN PATENT DOCUMENTS

| DE | 69217113 | 5/1997 |
| DE | 102008014758 | 10/2009 |
| EP | 2284102 | 2/2011 |
| WO | WO2004087529 | 10/2004 |
| WO | WO2013144838 | 10/2013 |
| WO | WO2013157924 | 10/2013 |
| WO | WO2014001584 | 1/2014 |
| WO | WO2014029803 | 2/2014 |
| WO | WO2014184652 | 11/2014 |
| WO | 2013149354 A2 | 10/2020 |

* cited by examiner

*Primary Examiner* — Sarang Afzali
(74) *Attorney, Agent, or Firm* — Morriss O'Bryant Compagni Cannon, PLLC

(57) ABSTRACT

The invention discloses a capsule for use in an extraction machine, having a bottom, a side wall and a cover, which together form a chamber for a substance for extraction. The capsule has a deformable area, which is configured to plastically deform in the outward direction under the conditions present during the extraction and to sealingly interact with a capsule holder of the extraction machine.

15 Claims, 2 Drawing Sheets

CAPSULE FOR USE IN EXTRACTION MACHINE

CROSS-REFERENCE TO RELATED APPLICATIONS

This application is a national phase entry under 35 U.S.C. § 371 of PCT/CH2016/000083 filed on May 27, 2016, which claims priority to Swiss Patent Application No. 00743/15 filed on May 27, 2015, the entirety of each of which is incorporated by this reference.

TECHNICAL FIELD

The present invention relates to capsules for receiving a substance for extraction, in particular coffee or tea, for use in an extraction machine, in particular a coffee maker or a tea maker, and a method for extraction.

BACKGROUND OF THE INVENTION

The preparation of beverages by extraction (for example, from coffee beans) is a well-known technique. For several years, it has been successfully proven—for reasons of convenience, improved quality and control of the extraction results—to package the substance for extraction in individual portions and to use these single sachets directly in an extraction machine. Over time, a plurality of extraction mechanisms have been developed and described, and diverse variations of configurations of single sachets have emerged.

In general, such single sachets for coffee makers have the shape of capsules, including a bottom, a side wall, a (mostly flange-like) edge and a cover. For preserving the quality of the substance for extraction, the bottom, the side wall and the cover are manufactured from an air-tight material, for example aluminum. Instead, other capsules are accommodated in an airtight secondary packaging. For the extraction, the capsule is inserted into a capsule holder of the extraction machine. Then, the capsule is optionally opened on one side (the inlet area, that is, either the bottom or the cover) using an injection element for an extraction fluid. Subsequently, the extraction fluid is fed under pressure into the capsule. When the extraction fluid comes into contact with the substance for extraction, an extract is formed, which eventually discharges on the opposite side of the capsule (the outlet area, that is, either the cover or the bottom).

For some capsules it is provided that the extract discharges through the cover. The cover is then, for example by the pressure of the extraction fluid, pressed against a plate of the extraction machine, which features raised areas and channels between these raised areas. In this instance, the cover tears open, and the described structure of the plate specifies the fracture points at the cover. The channels are provided with openings, which penetrate the plate and through which the extract can outflow (see, for example, DE 69217113 T2). For other capsules, the extract discharges through the bottom, for example via through-flow openings, and reaches an outlet of the capsule holder. It is also known to punch, with the aid of an opening and/or discharge element (in the following also referred to as "spike") through the side of the capsule, through which the extract discharges, thus, mostly the bottom or the cover. The spike may either serve only as an opening element, and the extract is able to outflow through the opening in the capsule formed by the spike past the spike in the direction of the outlet of the capsule holder. The spike, however, may also be hollow, and the extract can outflow through the spike out of the capsule holder, meaning that the spike itself forms the outlet (see US2005150391A1 or EP2284102A1).

The present invention described in this document may optionally also be a varied embodiment of the types of capsules described before.

Research conducted by a patent office has classified the following publications as having further relevance: DE102008014758 A1, WO2014/029803A1, WO2013/144838A1, WO2014/184652A1 and WO2004/087529A1.

The capsule disclosed in the DE102008014758A1 has a flexible plastic foil extending over the flange which extends radially outwards and over the rolled edge, in which the flange terminates. When inserting the capsule into the extraction machine, the plastic foil is mechanically deformed (crimped) by the closure mechanism of the capsule holder in the area of the rolled edge and produces the desired sealing between the extraction machine and the capsule.

The WO2013/144838A1 also describes a capsule, in which a flexible layer when closing the capsule holder is mechanically crimped at the flange, which has a sealing effect.

Very similar is the concept disclosed in WO2014/184652A1. There also, a mechanical deformation of the flange takes place for the purpose of sealing.

The WO2014/029803A1 also describes a capsule having the parts which mechanically deform when closing the capsule holder; however, this does not serve the purpose of sealing. Instead, the extraction machine, by the pressure necessary for the deformation, detects the process parameters necessary for the preparation of the extract. Here also, the deformation of the capsule has to be already completed at the onset of the extraction process.

Advantages of the Invention

It is an advantage of the present invention to provide a capsule, in particular a coffee capsule or a tea capsule, which is configured for use in an extraction machine and/or for carrying out an extraction method for producing an extract, in particular coffee or tea.

Advantageous varied embodiments of the capsule allow use of the capsule in different extraction machines. Moreover, the capsules may be particularly environmentally friendly, in particular compostable.

Further advantages of the present invention result from the subsequent description.

SUMMARY OF THE INVENTION

The advantages mentioned above are achieved by a capsule according to the claimed invention.

Disclosed is, inter alia, a capsule for use in an extraction machine, having a bottom, a side wall and a cover, which together form a chamber for a substance for extraction. It is advantageous if the capsule has a deformable area configured to (especially outwardly) plastically deform when using the capsule in the extraction machine and/or under the conditions present when using the extraction machine and/or under the conditions present while carrying out the method for extraction, and to sealingly interact with the capsule holder of the extraction machine.

Furthermore, disclosed is a method for extraction when using a capsule described in this document, including the steps: a) inserting a capsule filled with a substance for extraction into a capsule holder of an extraction machine; b)

injecting an extraction fluid, in particular water, into the capsule; c) through-flowing the capsule, and an extract is formed by the extraction fluid coming into contact with the substance for extraction; d) discharging the extract from the capsule. In this instance, it is advantageous if the deformable area is plastically deformed outwards in the direction of the capsule holder and sealingly interacts with the capsule holder.

Subsequently, features are described, and these features (individually) are to be regarded as exemplary features, even if they are not explicitly referred to as exemplary features. The features shall be disclosed separately (as part of any capsule or of any method for extraction) and—as long as they are not mutually exclusive—in any combination. This includes the possibility to simultaneously realize all described features.

The capsule is configured for use in an extraction machine and/or for carrying out a method for extraction for producing an extract, in particular for use in a coffee maker or tea maker.

The capsule may be a portioned capsule and/or a disposable capsule for single use.

The capsule may be a coffee capsule or a tea capsule, and/or the substance for extraction is coffee or tea, in particular ground coffee or tea leaves.

The side wall and/or the bottom and/or the deformable area may be manufactured (such as a single piece and/or by injection molding or deep drawing) from a material (subsequently referred to as "the material"), which is configured to plastically and/or permanently deform, in particular to outwardly deform, when using the capsule in the extraction machine and/or under the conditions present while carrying out the method for extraction and/or under the conditions present during the extraction, and which is configured to sealingly interact with the capsule holder of the extraction machine. Expediently, the part of the capsule described is positioned in such a manner that the sealing interaction with the capsule holder is achieved. The part may extend substantially annularly and/or continuously around the longitudinal axis of the capsule.

The capsule holder is the part of an extraction machine which is configured to receive the capsule for carrying out the method. Expediently, the production of the extract takes place while the capsule is received in the capsule holder. The capsule holder may form a cavity for the capsule and/or in places comes into contact with the capsule therein received and/or may have an outlet for the extract.

This adaptability of the capsule to the shape of the capsule holder enables the use of the capsule in different extraction machines. In particular, the described sealing interaction may reduce (for example, by at least 30, 60 or 90 percent compared to a capsule not having the described deformability) the amount of extraction fluid flowing on the outside and/or flowing laterally past the capsule and/or reaching the outlet area.

In particular, the material described above may be a plastic material.

The plastic material advantageously has a glass transition temperature and/or a heat deflection temperature ("HDT"; which may be according to standard DIN EN ISO 75, DIN EN ISO 75-1. -2 and/or-3, or HDT B (for example at 0.45 MPa)) and/or a refractory deformation temperature and/or a melting temperature of at least 40 or 45 degrees Celsius and/or at most 105, 98, 90 or 70 degrees Celsius. The deformation temperature mentioned further below may also assume this value.

The plastic material may be a plastic material having a portion of PLA ("polylactic acid") of at least 5, 10 or 15 weight percent and/or at most 95, 90 or 85 weight percent, in particular 40 through 70 or 50 through 60 weight percent, or more particularly 45 through 60 weight percent (in relation to the total weight of the plastic material or the material).

Alternatively or additionally, the plastic material may also have a portion of PBAT ("polybutyrate adipate terephthalate"), in particular biobased PBAT, and/or PBS (polybutylene succinate), in particular biobased PBS, and/or PBSA (polybutylene succinate adipate), in particular biobased PBSA, and/or lignin (which may be resourced from plants, in particular wood) and/or PHA (polyhydroxyalkanoate) and/or PHB (polyhydroxybutyrate), in particular biobased PHB, and/or PPC (polypropylene carbonate) and/or PEF (polyethylene furanoate), in particular biobased PEF, of at least 5, 10 or 15 weight percent and/or at most 95, 90, 85, 60, 40 or 20 weight percent (the information regarding the portion relates to the percentage of the respective polymer; weight percent relates to the respective total weight of the plastic material or the material). Mixing PLA with PBS allows to adapt, for example, the temperature at which the plastic material softens and deforms during the method. The addition of filler material, for example, calcium carbonate and/or talc (which may be as a portion (independently or in combination) of less than 30, 20 or 10 weight percent in relation to the total weight of the plastic material or the material) may be advantageous. In so doing, for example the rigidity and/or the toughness of the material may be increased.

Particularly, the plastic material may be a plastic material including PLA and/or PHB and/or PEF, the plastic material additionally including PHA and/or PBAT and/or PBS. In regard to the portions of PLA, PHB, PEF, PHA, PBAT and PBS, reference is made to the information above regarding PLA, PHB, PEF, PHA, PBAT and PBS. The sum of the portions of PLA, PHB and PEF (if present) together with PHA, PBAT and PBS (if present) may advantageously be at least 80, 90 or 95 percent of the plastic material.

The plastic material may have a density (which may be according to ISO 1183) of at least 1000, 1100, 1200 or 1300 kg/m$^3$ and/or at most 1900, 1700 or 1600 kg/m$^3$. Alternatively or additionally, it may be provided that the plastic material has an elasticity modulus (in particular at room temperature and/or according to ISO 527-2) of at least 2500, 3000, or 3300 MPa and/or at most 3900, 4200 or 4700 MPa.

It is particularly desireable if the plastic material is bio-degradable and/or compostable. The plastic material may meet the requirements of the standard DIN EN 13432 (or EN 13432) and/or the standard ASTM D6400 and/or the standard Australian Standard AS4736 and/or of Japanese Standard GreenPla and/or the standard Home Composting and/or the standard Chinese Standard GB/T.

The side wall and/or the bottom and/or the deformable area may be configured to be plastically deformed in the manner described in this document by the outwardly acting pressure (for example, of at least 1, 5, 8 or 10 bar and/or at most 30, 25 or 22 bar) of the extraction fluid guided through the capsule and/or only (or exclusively) after reaching a specific temperature (also referred to as "deformation temperature"). An equal pressure without the described temperature may not result in the plastic deformation described in this document. The described material and/or the described part of the capsule becomes flowable before or during its plastic deformation. It is advantageous if the capsule does not tear in the locations plastically deforming and/or if no additional opening forms in the capsule as a result of the plastic deformation.

The thickness and/or the strength of the wall of the capsule in the area of the bottom and/or of the side wall and/or of the deformable area may be at least 0.1, 0.2, or 0.3 millimeter and/or at most 3, 2, 1.5, 1, 0.8 or 0.7 millimeters. It may be provided that the thickness and/or the strength of the wall is smaller (for example by at least 10, 20, 30, 40 or 50 percent) in the location of the deformable area than in adjacent areas of the side wall and/or the bottom and/or than the average thickness or strength of the wall of the capsule. A smaller thickness results in a more rapid heating by the extraction fluid and, for this reason, in an easier deformation.

The capsule has an inlet area, into which the extraction fluid enters, and an outlet area, in which the extract exits the capsule. Expediently, the cover forms the inlet area and the bottom forms the outlet area, or vice versa.

The chamber may be configured to be through-flown from the inlet area in the direction of the outlet area by the extraction fluid and/or the extract. In this instance, the extraction fluid in the chamber comes into contact with the substance for extraction, and the extract is formed.

The deformable area may be situated between the inlet area (and/or the cover) and the outlet area (and/or the bottom). It is expedient if the deformable area (which may be substantially annularly and/or continuously) surrounds the capsule and/or the chamber and/or the side wall and/or the longitudinal axis of the capsule. It is particularly meaningful if the deformable area is configured as part of the side wall and/or of the bottom and/or if it is integrally formed with the side wall and/or the bottom.

The deformable area may be situated closer to the inlet area (and/or closer to the cover) than to the outlet area (and/or than to the bottom). If the capsule and/or the side wall has a web or flange running along the infill opening and/or along the cover, at which the cover is advantageously fastened, the deformable area may be situated, for example, adjacent to this web or flange.

The deformable area may extend from an inside of the capsule adjacent to the chamber to an outside of the capsule.

In particular, the deformable area may have an expansion in the direction from the inside to the outside of the capsule of at least 0.3 millimeter, at least 0.5 millimeter and/or at most 2 or 1 millimeters.

According to one variation, the capsule filled with the substance for extraction may be configured so to provide less resistance to the movement of the extraction fluid from the inlet area in the direction of the deformable area than from the inlet area in the direction of the outlet area.

The capsule may be filled with the substance for extraction is configured in such a manner that, while carrying out the method described in this document, the extraction fluid reaches the deformable area before it reaches the outlet area.

For example, it may be provided that a cavity exists between the inside of the cover and the substance for extraction, and the distance of the substance for extraction from the inside of the cover can, for example, be at least 0.1, 0.3 or 0.5 millimeter.

The side wall may substantially be in the shape of a rotational body and/or be configured substantially prismatically, in particular cylindrically, or particularly substantially circular cylindrically. The rotational body is expediently hollow, in particular, the side wall is hollow cylindrical.

As described before, the bottom, the side wall and the cover together form a chamber for a substance for extraction. Before attaching the cover, the side wall and the bottom expediently form a cavity for receiving the substance for extraction, and the substance for extraction may be filled into the cavity through an infill opening located, in relation to the cavity, opposite the bottom. After attaching the cover, which closes the infill opening, the bottom, the side wall and the cover advantageously form a closed chamber for the substance for extraction. The substance for extraction may advantageously be a pulverized or liquid beverage substrate.

It may be provided that the side wall has a web (for example, in the form of a flange) along the infill opening and/or where it is connected to the cover, and/or is thickened. The expansion of the web in the direction of the longitudinal axis of the capsule may, for example, be at least 0.3, 0.5 or 1 millimeter.

According to one variation, the deformable area may extend along the web and/or between the web and the bottom of the capsule, the deformable area advantageously directly connecting to the web.

The web increases the stability of the capsule and enables a stable connection of the cover to the side wall, so that even when the deformable area deforms, the capsule does not break in the area of the cover.

The cover may be made substantially from cellulose or include cellulose (for example, has a portion of at least 20, 30 or 50 weight percent and/or at most 95, 85 or 80 weight percent). The cover may include plastic fibers (for example, has a portion of at least 5, 10 or 20 weight percent and/or at most 60, 40 or 30 weight percent). The information regarding the weight is respectively in reference to the total weight of fibers in the cover or to the total weight of the cover. According to one variation, the fibers form the contact surface of the cover for connecting to the side wall. It is useful in this case and in other cases if the mentioned plastic fibers are PLA fibers, PBAT fibers, PBS fibers, PBSA fibers, lignin fibers (may be resourced from plants, in particular wood), PHA (polyhydroxyalkanoate) fibers, PHB (polyhydroxybutyrate) fibers, PEF (polyethylene furanoate) fibers and/or PPC (polypropylene carbonate) fibers, as this facilitates the connection of the cover to the side wall. Advantageously, the mentioned fibers may respectively be biobased fibers (for PLA fibers, thus, for example biobased PLA fibers). Alternatively, the cover may also be manufactured from cellophane, cellulose hydrate or cellulose film. The connection of the cover to the side wall may be established with the aid of, for example, welding, in particular hot plate welding or heat sealing or ultrasonic welding or high frequency welding or laser welding. The fibers may form a filter and/or be present in the form of a nonwoven material.

According to one varied embodiment, the cover or a cap connectable to the capsule may have a diameter or radius which is greater by at least 2, 3, 4, 6 or 10 millimeters than the side wall (and/or than the mentioned web), or the cover or the cap may protrude over the side wall (and/or the web) by the described extent. This allows the use of the capsule in specific extraction machines.

The thickness of the cover or cap and/or its expansion in the direction of the longitudinal axis of the capsule may (in total or at least in the area described previously), for example, amount to at most 1, 0.5 or 0.1 millimeter.

The area protruding over the side wall or the web may also be part of the cover, or it may be configured as a separate cap. The cap is (desireably releasably) connectable (for example, is mountable or snappable onto the capsule) to the capsule. The cap may, for example, be substantially annular or have areas disposed on a ring and protruding in the described manner over the side wall or the web. The cap may, for example, be made from a material described for the cover further above, in particular from cellulose, or it may be made from plastic or steel. It is advantageous if the cap is reusable and/or bio-degradable and/or compostable. Advantageously, the cap meets the requirements of the standard mentioned in conjunction with the plastic material (see p. 6). The cap may be connected to the capsule before inserting the capsule into the capsule holder and may again be removed from the capsule after carrying out the method.

The bottom may be connected by its outer edge to the side wall and/or be manufactured as a single piece with the side wall, for example, by injection molding or deep drawing.

The bottom may have a bottom plate, the bottom and/or the bottom plate may have through-flow openings. A quantity of through-flow openings may be at least 3, 9 or 27 and/or at most 500, 300 or 200. The through-flow openings extend through the bottom and/or the bottom plate. A size of the through-flow openings may be at least 0.1 or 0.2 square millimeter and/or at most 2 or 1 square millimeters.

The bottom and/or the bottom plate may form the outlet area, through which the extract exits the capsule. The cover may form the inlet area, through which the extraction fluid, in particular water, enters the capsule. In principle, the capsule may however also be through-flown in the reverse direction. For this reason, when mentioning the word "inlet area," respectively also the term "outlet area" is alternatively disclosed, and vice versa.

According to one variation, the bottom plate may have a thickness of at least 0.1, 0.2 or 0.3 millimeter and/or at most 2, 1.5, 1, 0.8 or 0.7 millimeters.

A support structure rising above the bottom plate may be situated on the outside and/or on the inside of the bottom.

The support structure may have one or a plurality of webs. Advantageously, the support structure may include (for example, at least 1, 2 or 3 and/or at most 15, 10 or 8) webs running between the center point of the bottom and the edge of the bottom (subsequently also referred to as "radial webs") and/or running along the edge of the bottom and/or include a substantially annular and/or self-contained web (subsequently also referred to as "annular web").

The radial webs may be connected to one another in the area of the center point of the bottom.

The distance of adjacent radial webs may diminish from the edge of the bottom in the direction of the center point of the bottom.

Adjacent radial webs may meet respectively in an angle which, for example, is smaller or equal to 120, 90, 80 or 60 degrees.

It may be provided that the radial webs and/or the annular web and/or the support structure in the point of their maximum height rise to at least 1, 1.5, 2 or 3 millimeters and/or at most 7, 5 or 4 millimeters above the bottom plate.

According to one variation, the annular web may rise at least to the height above the bottom plate, which is equal to the height of the radial webs.

It is furthermore advantageous if the annular web does not have gaps and/or has a height which is substantially constant over its length.

The radial webs may each have one gap, the gaps being located on a ring around the center point of the bottom. These gaps may serve to receive a support ring of the extraction machine. In so doing, the material used for the capsule may be reduced.

At the center of the bottom and/or within a radius of 7, 6, 5, 4 or 3 millimeters around the center point of the bottom, a recess may be situated, and/or the height of the supporting structure in this location may, at least in a subregion, be less than 80, 70 or 60 percent of the maximum height of the supporting structure.

Alternatively or additionally, the radial webs (in particular in the area of the recess) may be configured in a manner sloping obliquely in the direction of the center point of the bottom to the bottom plate.

According to one embodiment, within a radius of at least 2, 3 or 4 millimeters around the center point of the bottom, the bottom plate may not have any through-holes, and/or the bottom or the bottom plate may be closed in this area.

In general, also disclosed is any method, in particular a method for extraction, in which the capsule disclosed in this document is used. Such a method may be carried out with the aid of an extraction machine, which has a capsule holder.

Advantageously, the method includes the following steps: a) inserting a capsule filled with a substance for extraction into a capsule holder of the extraction machine; b) injecting an extraction fluid, in particular water, into the capsule; c) through-flowing the capsule, and an extract is formed by the extraction fluid coming into contact with the substance for extraction; d) discharging the extract from the capsule.

The injection of the extraction fluid takes place in the inlet area of the capsule described above, and the discharging takes place in the outlet area of the capsule described above.

The deformable area is plastically deformed, in particular outwardly deformed in the direction of the capsule holder, and may sealingly interact with the capsule holder. In particular, the distance of the deformable area from the capsule holder is reduced by the deformation. Alternatively or additionally, the contact area between the capsule and the capsule holder is enlarged by the deformation (for example, by at least 2, 5, 10 or 20 percent).

Before the extract exits the capsule, the deformable area may be heated by the contact with the extraction fluid, for example, to at least 40, 45 or 50 and/or at most 120, 110 or 100 degrees Celsius. Alternatively or additionally, the deformable area deforms plastically in the manner described in this document only after the described heating. Alternatively or additionally, the deformable area (only when or exclusively) is plastically deformed in the manner described in this document when a temperature of at least 40, 45, or 50 and/or of at most 105, 90 or 70 degrees Celsius has been reached. The deformation temperature mentioned further above may correspond to these temperature values.

When reaching the deformation temperature, the deformable area softens, it may then be deformed in the described manner, and in the deformed state hardens or solidifies after falling below the deformation temperature (in particular below the minimum values).

After the deformed area has cooled below the deformation temperature (in particular below the minimum values), the deformed area remains deformed.

Expediently, the deformed area deforms without tearing under the conditions described in this document.

It may be provided that the deformable area when being deformed as described approximates the capsule holder by a stretch of at least 0.1, 0.2, 0.5, 1, 2 or 3 millimeters and/or at most 7, 5 or 4 millimeters, and/or draws near the capsule holder to a distance of less than 0.2, 0.1 or 0.05 millimeter of the capsule holder.

It is particularly advantageous if the deformable area when being deformed as described deforms outwards by a stretch of at least 0.5, 1, 2 or 3 millimeters in the direction of the capsule holder.

Terms in this document should be understood in such a manner as they would be understood by those skilled in the art in the field. If a plurality of interpretations are possible within the respective context, each interpretation shall be disclosed. In particular in the case of ambiguity, alternatively or additionally, definitions specified in this document may be used.

The term "biobased" is understood so that the respective material referred to as "biobiased" is predominately made from renewable raw materials, in particular from plants. In particular, the portion of renewable raw materials is more than 50 weight percent.

If an expansion (for example, a length, width, height, depth, thickness, wall strength, distance, stretch, diameter, radius, cross section, value) is mentioned, the respective minimum and/or maximum and/or average expansion shall additionally be disclosed.

The longitudinal axis of the capsule may extend from the cover (in particular through the center point of the cover and/or the infill opening) to the bottom (in particular through the center point of the bottom).

In this document, when the definite article ("the") as well as also the indefinite article ("a") are used in connection with an item, insofar as not otherwise indicated, the item, without specifying whether it concerns the same item with the same designation, which is mentioned elsewhere, is to be disclosed. Independent thereof, it shall be disclosed that each mention of an item with the same designation concerns the same item. This applies to all items mentioned in the singular form.

If an item is mentioned in this document, this does not preclude the presence of additional items of the same kind. In other words, at the mention of an item, respectively "at least one" such item and "one or a plurality" of such items are to be disclosed. One, two, three or a plurality or even all of the additional items can optionally have the same features as the one item. This, in particular, applies to items such as the radial webs or the through-flow openings.

If the information regarding a standard is ambiguous, the most up-to-date version of the standard at the time of application and/or the effective version of the standard having the designation most similar to the referenced designation is meant.

BRIEF DESCRIPTION OF THE DRAWINGS

Not being true to scale.

DETAILED DESCRIPTION OF THE INVENTION

The present invention is subsequently explained in an exemplary manner on the basis of the drawing.

Figure 4:
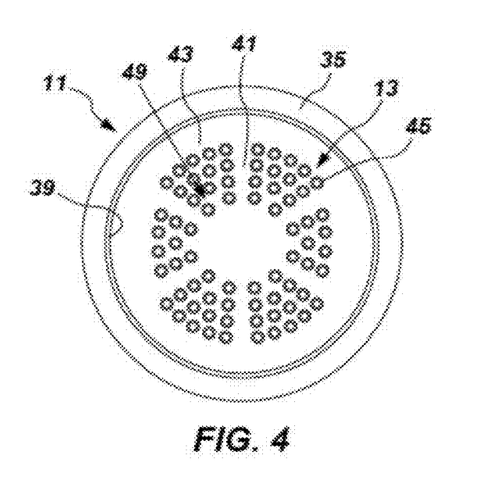
FIG. 4 shows a top view of the capsule from FIG. 1 without a cover.
Figure 5:
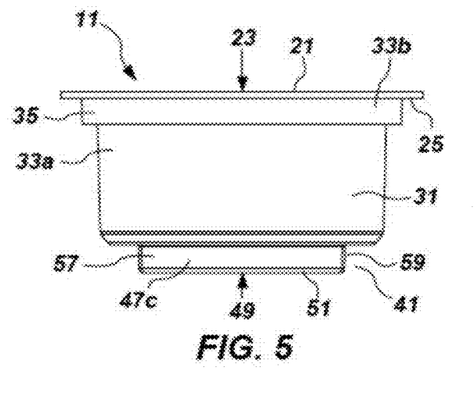
FIG. 5 shows a front view of the capsule from FIG. 1.
Figure 6:
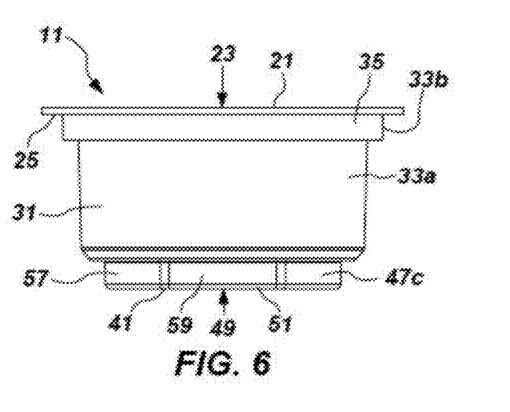
FIG. 6 shows a side view of the capsule from FIG. 1.

FIGS. 1 through 10 show the same capsule 11 for use in an extraction machine. FIGS. 1 through 6 show capsule 11 before use; FIGS. 7 through 10 show the capsule after use. For the purpose of making chamber 13 for the substance for extraction viewable, FIG. 4 shows the capsule without the cover, while FIGS. 1 through 3, 5 and 6 show the capsule having cover 21.

Figure 1:
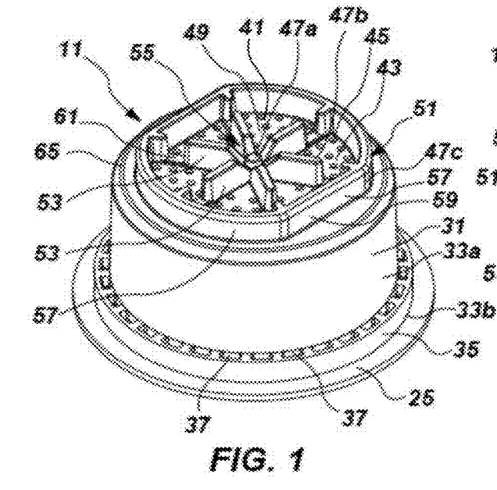
FIG. 1 shows a capsule in a perspective view from below.

Capsule 11 has a bottom 41, a side wall 31 connecting thereto and a cover 21, closing an infill opening 39.

Bottom 41 and side wall 31 may be manufactured as a single piece and/or be made from the same material (for example, by injection molding or deep drawing), the material expediently being a plastic material. If this plastic material has the required properties for the functioning of deformable areas 33a, 33b, 47a, 47b, 47c described further below, it is possible in this way to design deformable areas 33a, 33b, 47a, 47b, 47c as a single piece and/or from the same material as bottom 41 and/or side wall 31, which is beneficial regarding manufacturing technology.

Bottom 41, cover 21 and side wall 31 connecting bottom 41 and cover 21 form a chamber 13 in the interior of capsule 11 for receiving a substance for extraction, the substance for extraction expediently being filled into chamber 13 via infill opening 39 before attaching cover 21. The substance for extraction (not shown) is coffee in ground form. Chamber 13 may, for example, have a volumetric capacity of at least 1, 2 or 3 cubic centimeters and/or at most 40, 30 or 20 cubic centimeters. For the reasons described further below, it advantageously has been proven to fill chamber 13 not completely with a substance for extraction, so that an average distance of, for example, at least 0.5, 1, 1.5 or 2 millimeters still remains between cover 21 and the substance for extraction. This, however, is not mandatory.

For capsule 11 filled with the substance for extraction, the substance for extraction may be in direct contact with the inside of side wall 31 and/or the inside of cover 21 and/or the inside of bottom 41. It however may be also provided that a filter (in the form of a nonwoven material), for example a paper filter, is disposed between the substance for extraction and bottom 41. This is in particular useful if (the, for example, at least 3, 9 or 27 and/or at most 500, 300 or 200) through-flow passages 45 provided in bottom 41 for the discharge of the extract have a greater average diameter than the grains of the substance for extraction. In a desired variation, cover 21 has a filter (in the form of a nonwoven material), for example a paper filter. For example, the mentioned inside of cover 21 or the part of the cover covering infill opening 39 may substantially be formed by such a filter.

For easier reference, it shall be specified that the longitudinal axis of capsule 11 extends from cover 21 (in particular through the center point of cover 21 and/or of infill opening 39) to the bottom (in particular through center point 63 of bottom 41). In reference to chamber 13, infill opening 39 and/or cover 21 are located opposite bottom 41. Expediently, side wall 31 is configured substantially prismatically, in particular in a circular cylindrical manner.

Side wall 31 may have a web 35 extending along infill opening 39 and surrounding capsule 11. Web 35 increases the stability of capsule 11 and enlarges the contact surface of side wall 31 provided as a connection to cover 21. The expansion of web 35 in the direction of the longitudinal axis (thus, in the direction from cover 21 to the bottom) and/or obliquely to the longitudinal axis (in particular radially, thus, in the direction away from the longitudinal axis) may, for example, be at least 0.5, 1 or 1.5 millimeters and/or at most 5, 4 or 3.5 millimeters, the mentioned expansion advantageously being substantially constant over the circumference of capsule 11. Web 35 may have a plurality of recesses 37 extending from bottom 41 in the direction of cover 21, which are situated at a constant distance from one another and along the total length of web 35.

According to the shown varied embodiment, cover 21 may have a greater (for example, by at least 2, 3, 4, 6 or 10 millimeters) outer diameter than side wall 31 in the area of web 35, and/or the cover may extend (away from the longitudinal axis) beyond web 35 (for example, by at least 1, 2, 3 or 5 millimeters). This allows for using the capsule in specific extraction machines. In the area extending beyond the web and/or in diameter, the expansion of cover 21 in the direction of the longitudinal axis is less than 2, 1, 0.5 or 0.3 millimeters. The same effect may however also be achieved by a cap snappable onto the capsule, which is, for example in addition to a cover closing the infill opening, attachable to the capsule, and which in the described manner extends beyond the web or which has a respective outer diameter.

Figure 2:
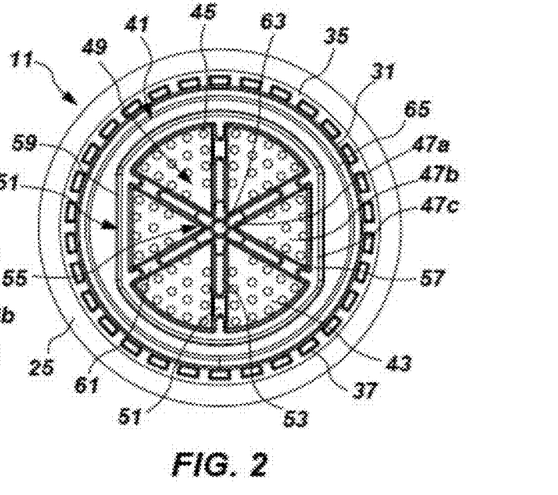
FIG. 2 shows a bottom view of the capsule from FIG. 1.
Figure 3:
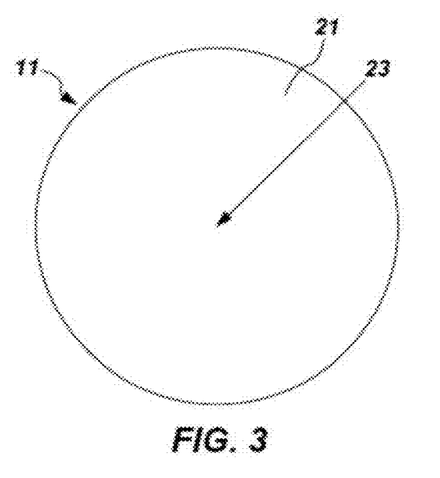
FIG. 3 shows a top view of the capsule from FIG. 1 having a cover.

In addition to web 35 connected to cover 21, capsule 11 on bottom 41 also has webs 53, 57, 59, which form a support structure 51. Bottom 41 has a bottom plate 43 having through-flow openings 45 for the extract to pass through, and webs 53, 57 rising above this bottom plate 43. The expansion of webs 53, 57 in the direction of the longitudinal direction of capsule 11 is, in this instance, referred to as the height of the webs. Support structure 51 has radial webs 53 and/or an annular web 57. Radial webs 53 (for example, at least 2, 3, 4 or 5 and/or at most 15, 10 or 8) are referred to as such webs because they extend radially outwards away from the longitudinal axis in the direction of edge 65 of bottom 41. Annular web 57 is referred to as such a web because it surrounds the longitudinal axis in a substantially annular (continuous) manner. If radial webs 53 and also an annular web 57 are provided, annular web 57 surrounds radial webs 53. Annular web 57 extends along edge 65 of bottom 41 and/or at a distance from edge 65 of bottom 41 and/or at a distance from the outside of side wall 31 of, for example, at least 0.5, 1 or 1.5 millimeters and/or at most 8, 7, 6 or 4 millimeters. In this instance, it is advantageous if annular web 57 has areas 59 on two opposite sides in relation to the longitudinal axis, which run substantially parallel to each other and which are, for example, at least 0.5, 1 or 1.5 centimeters in length. In this way, annular web 57 may additionally form a guide, which facilitates the correct insertion of capsule 11 into an extraction machine. A height of radial webs 53 and/or of annular web 57 is at least 0.5, 1 or 1.5 millimeters and/or at most 7, 6, 5, 4 or 3.5 millimeters.

In an area around the longitudinal axis and/or at the center of bottom 41, a recess 55 is provided. The area is located within a circle having a radius of at least 0.5, 1 or 1.5 millimeters and/or at most 5, 4 or 3.5 millimeters. In the aforementioned area, the average height or the minimum height of radial webs 53 is less (for example, by at least 10, 20, 30 or 50 percent) than the maximum or the average height of radial webs 53 (in total), if radial webs 53 are provided at all in the aforementioned area. Owing to the increased stability, it is however advantageous if radial webs 53 are connected in the aforementioned area, the radial webs being configured in a manner sloping (sloping obliquely) in the direction of the center of bottom 41 to bottom plate 43.

A minimum height of radial webs 53 in the aforementioned area of recess 55 may be at least 10, 20 or 30 percent of the average height of radial webs 53 (in total). Owing to recess 55, a space remains at the center of bottom 41 to receive an injection, opening and/or drainage element ("spike") of an extraction machine, the functions of which are described in the introduction. Radial webs 53 and/or annular web 57 may have a substantially constant and/or equal height over at least 50, 60 or 80 percent of their length. Described recess 55 constitutes an exception, and further recesses 61 may be provided between radial webs 53 and annular web 57 or in radial webs 53. Expediently, these recesses 61 are situated on a ring around the longitudinal axis of capsule 11, as they serve to receive a support ring of the extraction machine.

It is provided that the water is guided through cover 21 into capsule 11 and that the extract of capsule 11 discharges through bottom 41, meaning that cover 21 forms inlet area 23 for the water and that bottom 41 forms outlet area 49 for the extract. In principal, this configuration may also be reversed.

Capsule 11 has one or a plurality of deformable areas 33a, 33b, 47a, 47b, 47c, which are configured to plastically deform under the conditions present during the extraction in the capsule holder of the extraction machine and to sealingly interact with the capsule holder. The deformation may result in that the flow of water (from inlet area 23 in the direction of outlet area 49) is impeded or reduced between the capsule and the capsule holder and/or flowing on the outside past the capsule. In this instance, deformable areas 33a, 33b, 47a, 47b, 47c deform in the direction of the capsule holder and/or adapt to the shape of the capsule holder, the deformation reducing the distance between deforming areas 33a, 33b, 47a, 47b, 47c and the capsule holder. As described above, bottom 41 and side wall 31 are made from a material which allows for such a deformation and which, for this purpose, has a glass transition temperature and/or a heat deflection temperature and/or a refractory deformation temperature and/or a melting temperature, which is lower than the temperature of the water and/or of the extract, which during the extraction comes into contact with the material (in particular in the location in which the deformable areas are situated).

A plurality of areas have been identified which are suitable as deformable areas 33a, 33b, 47a, 47b, 47c. In part, these are areas 33a and 33b, which are situated at side wall 31 or are formed as part of side wall 31 and which extend substantially along the total circumference of capsule 11. These deformable areas 33a, 33b are situated at a distance of less than 1, 0.5 or 0.3 centimeters from infill opening 39 and/or from cover 21, so that relatively early during the extraction process they come into contact with the water and deform. Further deformable areas 47a, 47b, 47c may be situated at bottom 41 or be configured as part of bottom 41. In particular, the area of recess 55 at the center 63 of bottom 41 described further above and/or bottom plate 43 and/or annular web 57 may form deformable areas 47a, 47b, 47c. These are areas which in the deformed state may sealingly interact with parts of the capsule holder, via which the extract discharges from the capsule holder. For example, the area of recess 55 may plastically deform around a spike of the capsule machine (see FIGS. 9 and 10). Through a plastic deformation, annular web 57 may also sealingly interact with the bottom of the capsule holder and, in this way, reduce the amount of water which is able to flow past capsule 11 to the spike or outlet.

In the method of extraction, water having a temperature of, for example, at least 80 degrees Celsius is conducted into inlet area 23 through cover 21 into capsule 11. Owing to the contact of the water with the substance for extraction in chamber 13, an extract results, which exits capsule 11 in outlet area 49, in particular, through through-flow openings 45. In this instance, the water comes into contact with deformable area 33a, the deformable area plastically deforming in the outward direction, thus deforming away from the longitudinal axis of capsule 11 (see FIG. 7), and it sealingly interacts with the capsule holder of the extraction machine. It is meaningful if filled capsule 11 is configured to provide less resistance to the water in relation to its movement through chamber 13 in the direction from inlet area 23 to deformable area 33a than in relation to the movement of the water through chamber 13 in the direction from inlet area 23 to outlet area 49. It is namely desired that the water during the extraction process comes into contact with deformable area 33a as soon as possible, for example, within less than 5, 4 or 3 seconds after the water has reached inlet area 23. For example, this can be achieved in that a channel leading from inlet area 23 to deformable area 33a is present between the inside of cover 21 and the substance for extraction. For example, capsule 11 may not be filled up to the cover by the substance for extraction, so that a clearance remains between the cover and the substance for extraction, through which the water can flow to side wall 31 and, for this reason, to deformable area 33a. Within the described time, the water can come into contact with deformable area 33a from within capsule 11 and/or from outside of capsule 11, both conditions being fulfilled, because, as a result, a more rapid heating and, for this reason, deformation of deformable area 33a may be achieved.

FIGS. 7 through 10 show capsules 11 after use, that is, in a partially deformed condition. In this instance, the difference in deformation of the shown capsules shall be noted. This may be attributed to that capsule 11 may be used in different extraction machines. Owing to the differently configured capsule holders and to carrying out the extraction process in different ways (pressure, temperature, etc.), different deformations of the capsule result, the direction of the deformation of deformable areas 33a, 33b, 47a, 47b, 47c being illustrated by arrows in FIGS. 7 through 10.

Figure 7:
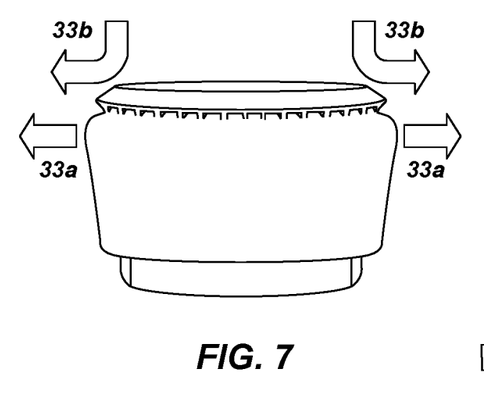
FIG. 7 shows a front view of the capsule from FIG. 1 after carrying out the method, having deformations in the area of the inlet opening.

FIG. 7 shows a capsule 11 having deformations in the area of infill opening 39. On the one hand, this includes a deformation of deformable area 33b, which is formed by web 35, and on the other hand, a deformation of deformable area 33a, which is situated substantially adjacent to web 35. Two deformable areas 33a and 33b extend substantially along the total circumference of capsule 11 and deform outwards, that is, away from the longitudinal axis of capsule 11. Deformable area 33b is situated adjacent to the cover. Since cover 21 under the described conditions during the extraction process does not or at least not as significantly deform as deformable area 33b, deformable area 33b is, by the connection with cover 21, prevented from deforming on the side of cover 21. On the side of deformable area 33b facing away from cover 21, the deformation is greater.

Figure 8:
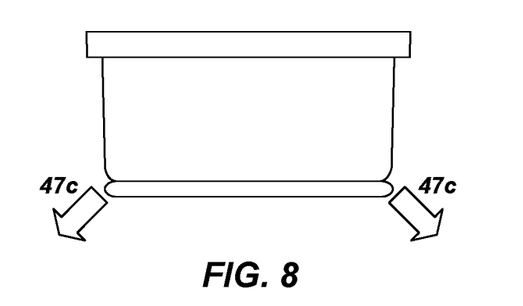
FIG. 8 shows a side view of the capsule from FIG. 1 after carrying out the method, having deformations in the area of the annular web.

FIG. 8 shows a capsule 11 having deformations in the area of annular web 57. Deformable area 47c, which is formed by annular web 57, deforms outwards, that is, away from the longitudinal axis of capsule 11. It is assumed that annular web 57 is, by the pressure acting from cover 21 in the direction of bottom 41 onto capsule 11, clamped between capsule 11 and the capsule holder, and spreads outwards, while the annular web in its shape simultaneously adapts to the shape of the capsule holder and, in this way, acts as a seal.

Figure 9:
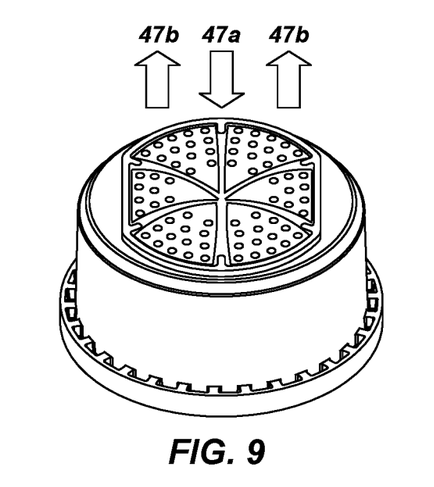
FIG. 9 shows a perspective view of the capsule from FIG. 1 from below after carrying out the method, having deformations in the area of the bottom plate and the center of the bottom.
Figure 10:
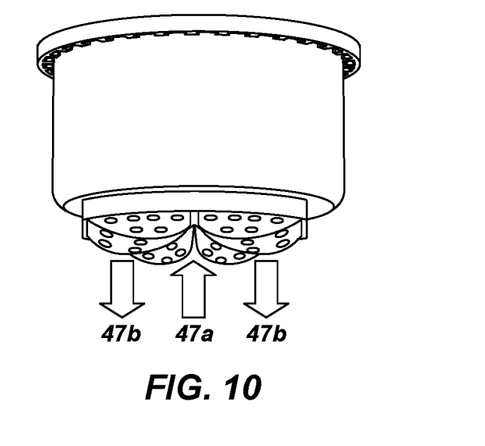
FIG. 10 shows a perspective view of the capsule from FIG. 1 from below after carrying out the method, having deformations in the area of the bottom plate and the center of the bottom.

FIGS. 9 and 10 show a capsule 11, on the one hand, having deformations in the area of center 63 of bottom 41, in particular a deformation of recess 55, and on the other hand, having deformations of bottom plate 43. The deformation of recess 55 inwards in the direction of chamber 13 results from the spike of the extraction machine. Before the onset of the extraction process, the spike is, when capsule 11 is received in the capsule holder, only partially received in recess 55 and/or recess 55 is too small to completely receive the spike. During the extraction process, the spike can, because of the softening of deformable area 47a, press bottom 41 into chamber 13 and/or enlarge recess 55 with regard to its expansion in the direction of the longitudinal axis of the capsule. In so doing, bottom 41 does not tear. Otherwise, bottom plate 43, forming deformable area 47b, deforms outwards in the direction away from cover 21 and partially fills the space between radial webs 53 (for example, by at least 30, 50 or 70 percent).

What is claimed is:

1. A capsule for use in an extraction machine, comprising:
a bottom, a hollow cylindrical side wall and a cover, connected together to form a chamber for a substance for extraction, wherein the capsule has a deformable area which extends from an inside of the capsule bordering the chamber to an outside of the capsule, and which is configured, when a temperature of the capsule of at least 40 degrees Celsius is reached, to outwardly plastically deform under a pressure of an extraction fluid conducted through the capsule, which is acting from within the capsule in an outward direction, and which sealingly interacts with a capsule holder of the extraction machine;
wherein the bottom has a bottom plate comprising a plurality of through-flow openings and on an outside has a support structure rising above the bottom plate, the support structure having a plurality of radial webs extending between a center of the bottom toward an outer edge of the bottom and/or an annular web extending continuously along the outer edge of the bottom, the support structure at a point of a maximum height of the support structure rises at least 2 millimeters above the bottom plate, and within a radius of less than 3 millimeters around the center of the bottom a height of the support structure around the center of the bottom is at least in a subregion that is less than 80 percent of the maximum height of the support structure.

2. The capsule of claim 1, wherein the capsule has an inlet area for an entry of the extraction fluid and an outlet area for discharging an extract, wherein the deformable area annularly surrounds the chamber between the inlet area and the outlet area.

3. The capsule of claim 2, wherein the deformable area is situated closer to the inlet area than to the outlet area.

4. The capsule of claim 2, wherein the capsule is filled with a substance for extraction, wherein the filled capsule is configured so to provide less resistance to the movement of the extraction fluid from the inlet area in a direction of the deformable area than from the inlet area in the direction of the outlet area, so that the extraction fluid reaches the deformable area before it reaches the outlet area.

5. The capsule of claim 1, wherein at least one of the side wall or the bottom is made from a plastic material and forms the deformable area.

6. The capsule of claim 5, wherein the plastic material is a compostable plastic material made from predominantly renewable raw materials and wherein a portion of renewable raw materials is more than 50 weight percent of the plastic material.

7. The capsule of claim 1, wherein the deformable area is made from a plastic material, which has at least one of a glass transition temperature, a heat deflection temperature, a refractory deformation temperature or a melting temperature between 40 and 105 degrees Celsius.

8. The capsule of claim 1, wherein the deformable area is made from a plastic material, which has at least one of a glass transition temperature, a heat deflection temperature, a refractory deformation temperature or a melting temperature between 45 and 98 degrees Celsius.

9. The capsule of claim 1, wherein the deformable area is made from a plastic material, which has at least one of a glass transition temperature, a heat deflection temperature, a refractory deformation temperature or a melting temperature between 45 and 90 degrees Celsius.

10. The capsule of claim 1, wherein the deformable area capable of expansion in a direction from the inside of the capsule to an outside of the capsule of at least 0.1 millimeter.

11. The capsule of claim 1, wherein the deformable area has an expansion in a direction from the inside of the capsule to an outside of the capsule of at least 0.3 millimeter.

12. The capsule of claim 1, wherein the deformable area has an expansion in a direction from the inside of the capsule to an outside of the capsule of at most 2 millimeters.

13. The capsule as recited claim 1, wherein the bottom at a center has a recess.

14. The capsule of claim 1, wherein within the radius of less than 3 millimeters the height of the support structure around the center of the bottom is at least in the subregion that is less than 70 percent of the maximum height of the support structure.

15. The capsule of claim 1, wherein within the radius of less than 3 millimeters the height of the support structure around the center of the bottom is at least in the subregion that is less than 60 percent of the maximum height of the support structure.

* * * * *